United States Patent [19]

Medlin et al.

[11] Patent Number: 4,962,489

[45] Date of Patent: Oct. 9, 1990

[54] ACOUSTIC BOREHOLE LOGGING

[75] Inventors: William L. Medlin, Dallas; Stephen J. Manzi, Carrollton, both of Tex.

[73] Assignee: Mobil Oil Corporation, Fairfax, Va.

[21] Appl. No.: 501,392

[22] Filed: Mar. 26, 1990

Related U.S. Application Data

[63] Continuation of Ser. No. 331,152, Mar. 31, 1989, abandoned.

[51] Int. Cl.$^5$ .................. G01V 1/40; G01N 29/00
[52] U.S. Cl. .................................. 367/32; 367/28; 367/35; 181/105; 73/579
[58] Field of Search .................. 367/28, 29, 30, 32, 367/35; 364/422, 924.5; 73/579, 630; 181/105

[56] References Cited

U.S. PATENT DOCUMENTS

| | | | |
|---|---|---|---|
| 3,817,430 | 4/1989 | Benes et al. | 73/579 |
| 4,128,011 | 12/1978 | Savage | 73/579 |
| 4,255,798 | 3/1981 | Havira | 181/105 |
| 4,458,340 | 7/1984 | Lautzenhiser | 367/32 |
| 4,688,185 | 8/1987 | Magenheim et al. | 364/563 |
| 4,715,019 | 12/1987 | Medlin et al. | 367/31 |
| 4,718,046 | 1/1988 | Medlin | 367/32 |
| 4,733,380 | 3/1988 | Havira | 367/35 |
| 4,742,495 | 5/1988 | Medlin et al. | 367/31 |

*Primary Examiner*—Nelson Moskowitz
*Attorney, Agent, or Firm*—Alexander J. McKillop; Charles J. Speciale; George W. Hager, Jr.

[57] ABSTRACT

An acoustic borehole logging system employs an acoustic tranmitter excited by a sweep frequency tone burst to produce an acoustic output having a free-field frequency spectrum of at least one resonant frequency of vibration. A closely-spaced acoustic receiver detects a borehole frequency spectrum that is representative of the acoustic transmitter free-field frequency spectrum altered by the effects of the properties of the subsurface formulation materials comprising the borehole wall. Such detected borehole frequency spectrum is recorded in correlation with depth as a log of the material properties of the subsurface formations surrounding the borehole.

9 Claims, 6 Drawing Sheets

ACOUSTIC BOREHOLE LOGGING

This is a continuation of copending application Ser. No. 331,152, filed on Mar. 31, 1989.

BACKGROUND OF THE INVENTION

It has long been known to log open boreholes to measure acoustic wave energy traveling through rock formations surrounding the borehole. Borehole logging tools have been used for this purpose which normally comprise a sound source, or acoustic transmitter, and one or more receivers disposed at spaced-apart distances from the transmitter. By measuring the travel time of such acoustic energy between the transmitter and receivers it is possible to determine the nature of properties of the surrounding rock formations.

Typically such borehole logging tools have provided acoustic energy waves in the form of compressional waves, shear waves, tube waves and normal mode or pseudo-Rayleigh waves. Various signal timing and wave front analysis methods have been utilized for distinguishing between these various waves received at a given receiver. For descriptions of various logging techniques for collecting and analyzing acoustic energy waves in the borehole reference may be made to U.S. Pat. Nos. 3,333,238 to Caldwell; 3,362,011 to Zemanek, Re. 24,446 to Summers; and 4,383,308 to Caldwell.

SUMMARY OF THE INVENTION

In accordance with the present invention there is provided a new method for identifying the nature or properties of subsurface formations surrounding a borehole which does not measure acoustic energy traveling through such formations bu instead utilizes the effect that the rock material forming the wall of the borehole has on the resonance characteristics of the acoustic energy output form the acoustic energy transmitter over a broad band of acoustic energy frequencies.

More particularly, a borehole is traversed with a borehole logging tool having a free-field, frequency spectrum with at least one characteristic resonant frequency of vibration. The transmitter is repeatedly excited with a swept frequency tone burst to cause the transmitter to produce an acoustic energy output within the borehole having a borehole frequency spectrum that is altered from the free-field frequency spectrum by the properties of the subsurface formation which introduce additional resonant frequencies of vibration into the acoustic energy output of the transmitter. A receiver is spaced sufficiently close to the transmitter such that its output is representative of the borehole frequency spectrum. Such receiver output is recorded in correlation with depth as a log of the properties of the subsurface formations comprising the borehole wall. The material properties are identified from the various resonance peaks within the recorded borehole frequency spectrum.

In one aspect, an envelope of the amplitude modulation of the recorded borehole frequency spectrum is detected and subsurface formation properties identified from amplitude peaks on the detected envelope.

In another aspect frequency shifts are detected with depth in the resonance peaks of the recorded borehole frequency spectrum as an identification of changes in the material properties of the subsurface formations.

In a still further aspect, amplitude peaks are identified for the free-field frequency spectrum characteristic of the acoustic transmitter. Amplitude peaks are also identified for the borehole frequency spectrum characteristic of the acoustic transmitter as recorded by the receiver of the borehole logging tool within the confines of the borehole. The ratio of the amplitude peaks of the free-field and borehole frequency spectra is determined and changes in such ratio used as an indication of changes in the material properties of the subsurface formations.

In a yet further aspect, the acoustic transmitter is excited with a frequency swept sine wave tone burst at periodic intervals within the borehole of the order of one foot, for example. Each tone burst is linearly swept in frequency over a range from 0 up to about 20 kilohertz over a time period of the order of a second or less. The receiver is spaced no greater than one to two feet from the transmitter so that travel time of the acoustic energy to the receiver is significantly less than the excitation period of the transmitter. In this manner the recording of the borehole frequency spectrum with depth is not affected to any significant extend by differences in travel time.

DESCRIPTION OF THE PREFERRED EMBODIMENT

Figure 1:
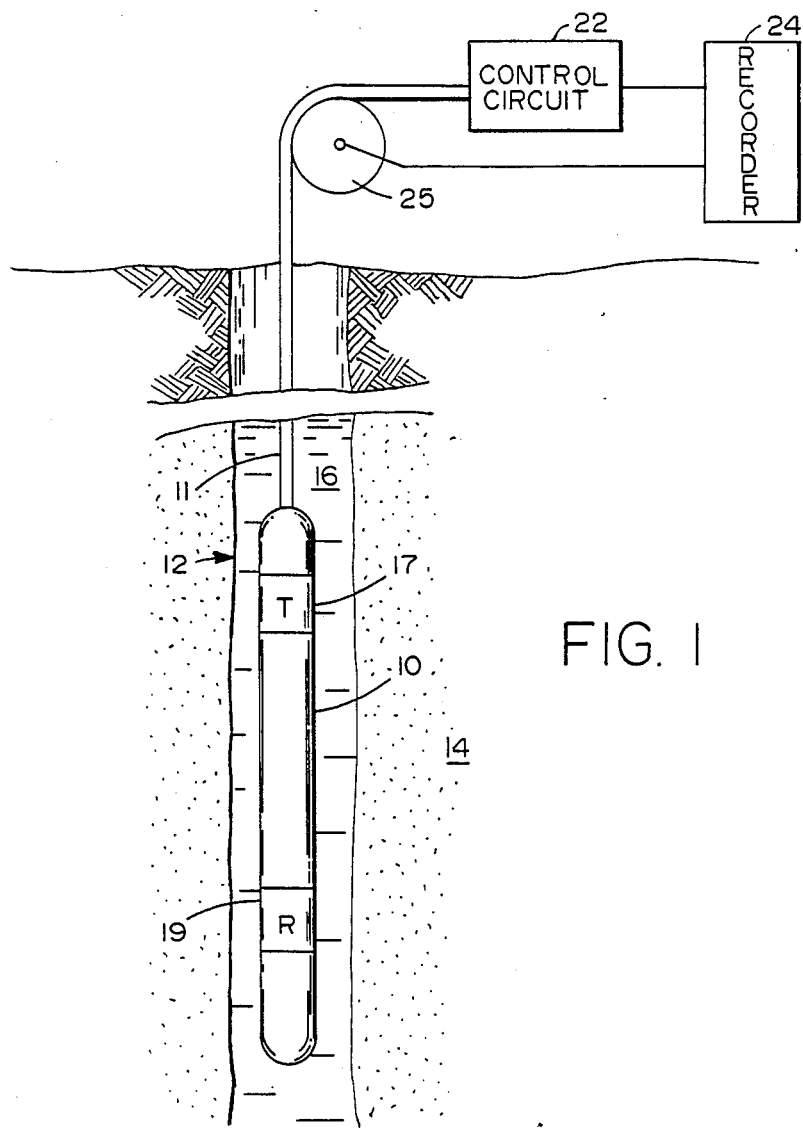
FIG. 1 illustrates an acoustic borehole logging system for use in carrying out the method of the present invention.

A borehole logging system for carrying out the acoustic borehole logging method of the present invention is shown in FIG. 1. The logging system includes an elongated logging tool 10 which is suspended from a cable 11 within a borehole 12 which traverses a subterranean formation of interest indicated by reference character 14. Formation 14 may be a suspected oil- or gas-bearing formation which is to be characterized in regard to its porosity, fluid saturation, or such other information as may be desired. The borehole 12 is filled with a liquid, such as drilling mud, indicated by reference numeral 16. The logging tool 10 comprise an acoustic transmitter 17 and at least one receiver 19.

Signals from the logging tool 10 are transmitted uphole by the conductors in cable 11 to a suitable utilization system at the surface. For example, the utilization system is illustrated as comprising an uphole analysis and control circuit 22 and a recorder 24 in order that the output from circuit 22 may be correlated with depth as provided from sheave 25.

The logging tool 10 may be moved through the borehole at any suitable rate while it is operated to generate and receive acoustic pulses. Typically, the tool will be lowered to the bottom of the interval to be logged and then pulled upwardly during the logging measurements at a speed of at least 10 feet per minute. Somewhat greater logging speeds, e.g., 20 feet per minute, normally can be used.

In accordance with the method of the present invention, the borehole logging system of FIG. 1 is used to carry out a frequency scan of the borehole adjacent subsurface formations of interest. To carry out such a frequency scan, the acoustic transmitter 27 employed comprises at least one characteristic resonance frequency between a few hundred hertz and several kilohertz. Such a resonator type transmitter may preferably take the form of a double bender-type transducer, a flexure disc-type transducer or a Helmholtz type transducer. A suitable bender-type transducer is described in U.S. Pat. No. 4,718,046 to Medlin. A suitable disc-type transducer is described in U.S. Pat. Nos. 3,363,118 to Sims and 4,742,495 to Medlin and Slover. A suitable Helmholtz type transducer is described in U.S. Pat. No. 4,674,067 to Zemanek. The teachings of these patents are incorporated herein by reference.

Figure 2:
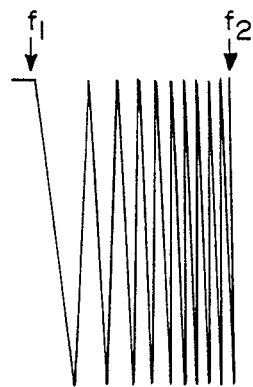
FIG. 2 is a typical swept frequency tone burst utilized to excite the acoustic transmitter of the acoustic borehole logging system of FIG. 1.

The frequency scan is carried out by driving the acoustic transmitter 17 with a continuous wave of swept frequency. Preferably the transmitter is driven with such continuous wave of sept frequency for a period of about one second. During this driving period the frequency is swept at a linear rate from about 0 to about 20 kilohertz as shown in FIG. 2. The receiver 19 is closely spaced from the transmitter, no more than about 1 to 2 feet, to detect the response of the borehole to the swept band of frequencies contained in the transmitter's output. Receiver 19 may be any of several type hydrophones or ceramic devices conventionally used in acoustic borehole loggin. Such receiver should preferably have a flat response over the acoustic frequency band.

Figure 3:
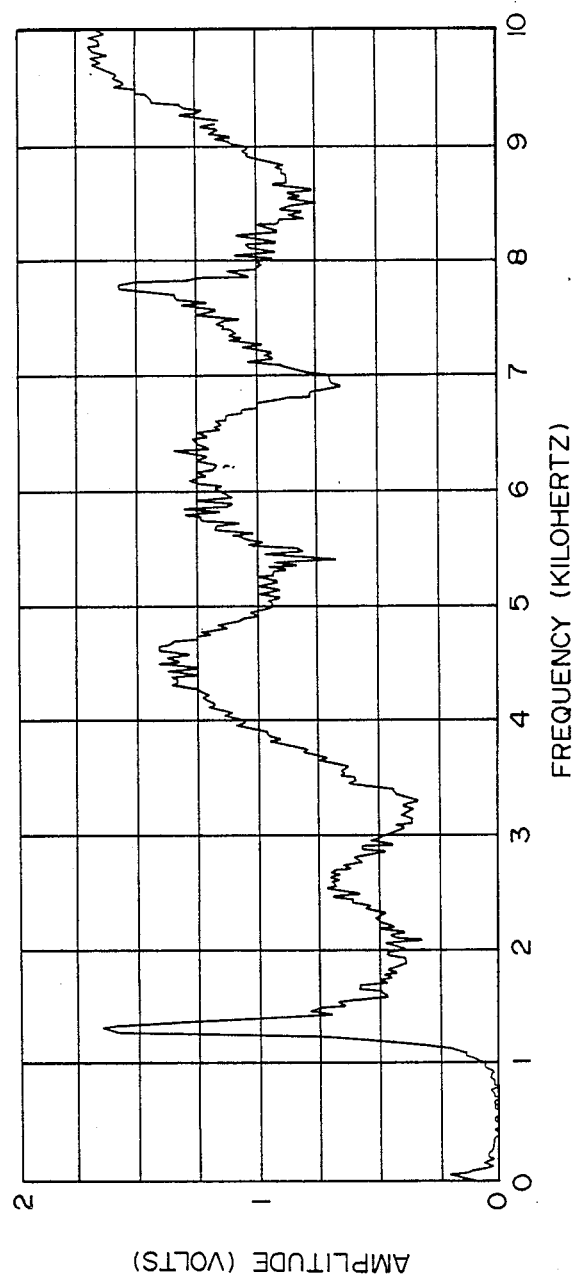
FIG. 3 is a typical frequency spectrum output of the acoustic transmitter of the acoustic borehole logging system of FIG. 1.

When the transmitter 17 is excited with this driving frequency, a spectrum of vibration energy is produced. If the transmitter is suspended in a very large body of water, the surroundings have little effect and the frequency spectrum is characteristic of the transmitter alone. Such a frequency spectrum has been termed the free-field spectrum and is shown in FIG. 3 for a Helmholtz resonator driven with a continuous wave of swept frequency from 0 to 10 kilohertz. Each amplitude peak in FIG. 3 is associated with a characteristic transmitter resonance frequency. However, when such a transmitter is suspended within a borehole, such characteristic free-field spectrum is greatly altered by the environment of the borehole 12 and the closely spaced receiver 19 produces a borehole frequency spectrum much different from the free-field spectrum. This borehole frequency spectrum is characteristic of both the transmitter 17 and the borehole environment. The borehole, in effect, acts like a leaky resonant cavity which introduces new resonance peaks in the frequency spectrum. The relative amplitudes of the peaks and the frequencies at which they occur are strongly influenced by the properties of the subsurface formation material comprising the borehole wall. The foot-by-foot frequency spectra obtained in this manner are correlated with such changes in the subsurface formation as lithology and fluid saturation conditions.

Figure 4:
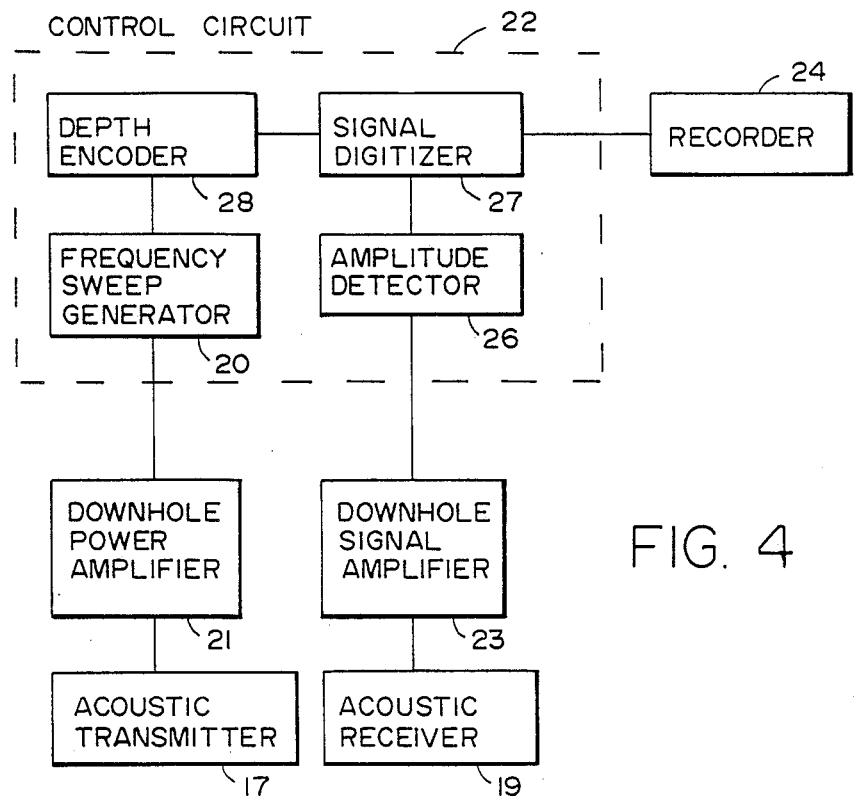
FIG. 4 is a schematic block diagram of electronic circuitry utilized in the operation of the acoustic borehole logging system of FIG. 1.

Referring now to FIG. 4, a frequency sweep generator 20 provides a swept-frequency drive such as the sine wave drive of FIG. 2 for example. Commercial devices are available for generating such tone bursts, such as a Model 7060 Generator, supplied by Exact Electronics, Hillsboro, Oregon with a Model MC 2500 Power Amplifier, supplied by McIntosh Laboratory, Binghamton, N.Y. Amplitudes are in the range of 100–150 volts. This voltage is sufficient for generating acoustic source levels from the transmitter which will provide detectable acoustic signals in conventional borehole logging tools. This swept frequency is carried by the logging cable 11 to a downhole power amplifier 21 in the logging tool 10. This amplifier 21 produces a driving current which excites the acoustic transmitter 17 through the swept frequency range. Transmitter 17 responds with its characteristic resonance vibration and the receiver 19 measures the response of the borehole to these vibrations, thus producing an output representative of a borehole frequency spectrum. The output of receiver 19 amplified by a downhole signal amplifier 23 and carried out over cable 11 to an uphole amplitude detector 26. A continuous measurement of the receiver 19 output amplitude is provided during each frequency sweep by the amplitude detector 26. Such amplitude detector provides a way to sense and record amplitudes much more rapidly than with a conventional signal analyzer. This allows successive traces to be recorded at one-foot intervals while moving the logging tool along a borehole at normal logging speeds.

Amplitude detector 26 provides an output which corresponds to the envelope of the amplitude peaks in the received signal. This envelope can be described as an amplitude modulation of the frequency sweep caused by resonances in the transmitter and the borehole. Such a modulation envelope is converted to a simple trace by a signal digitizer 17 and recorded by a recorder 24 such as a magnetic tape recorder for example.

The simplest type of amplitude detector is the well-known diode and RC network used as the audio detector in AM radios. The R and C components must be selected to provide the proper time constant. If the time constant is too large, its output will not follow rapid variations in peak amplitudes. If the time constant is too small, its output will contain ripple components associated with individual cycles of the low frequency portion of the continuous wave. A suitable time constant would be of the order of the 10 milliseconds provided by a resistance R of about 10 kilohms and a capacitance C of about 1 microfarad. More elaborate detectors can be applied such as those based on phase lock loop principles, for example.

Figure 5:
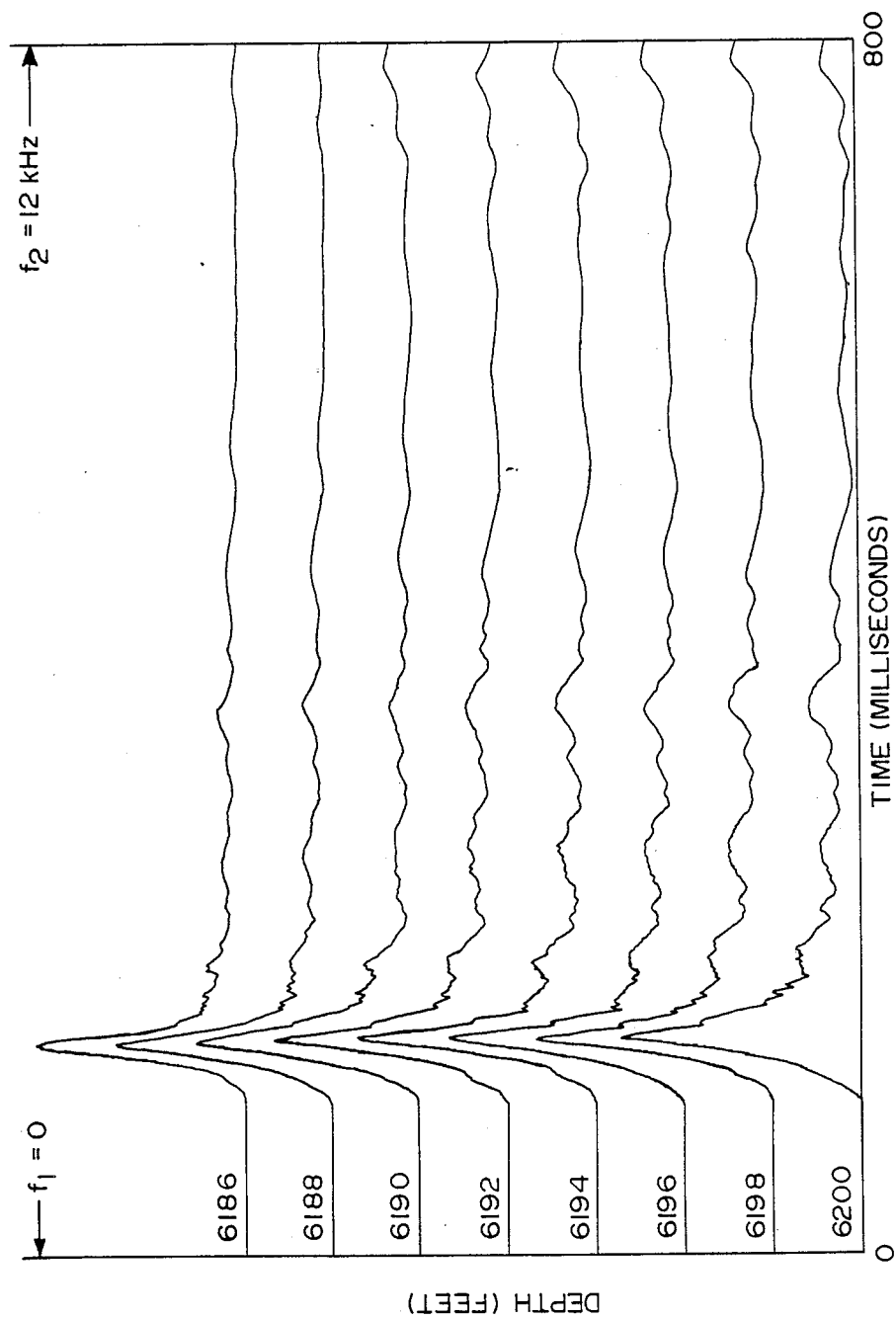
FIGS. 5–7 are typical acoustic receiver waveforms as might be displayed by the recorder of the acoustic borehole logging system of FIG. 1.
Figure 6:
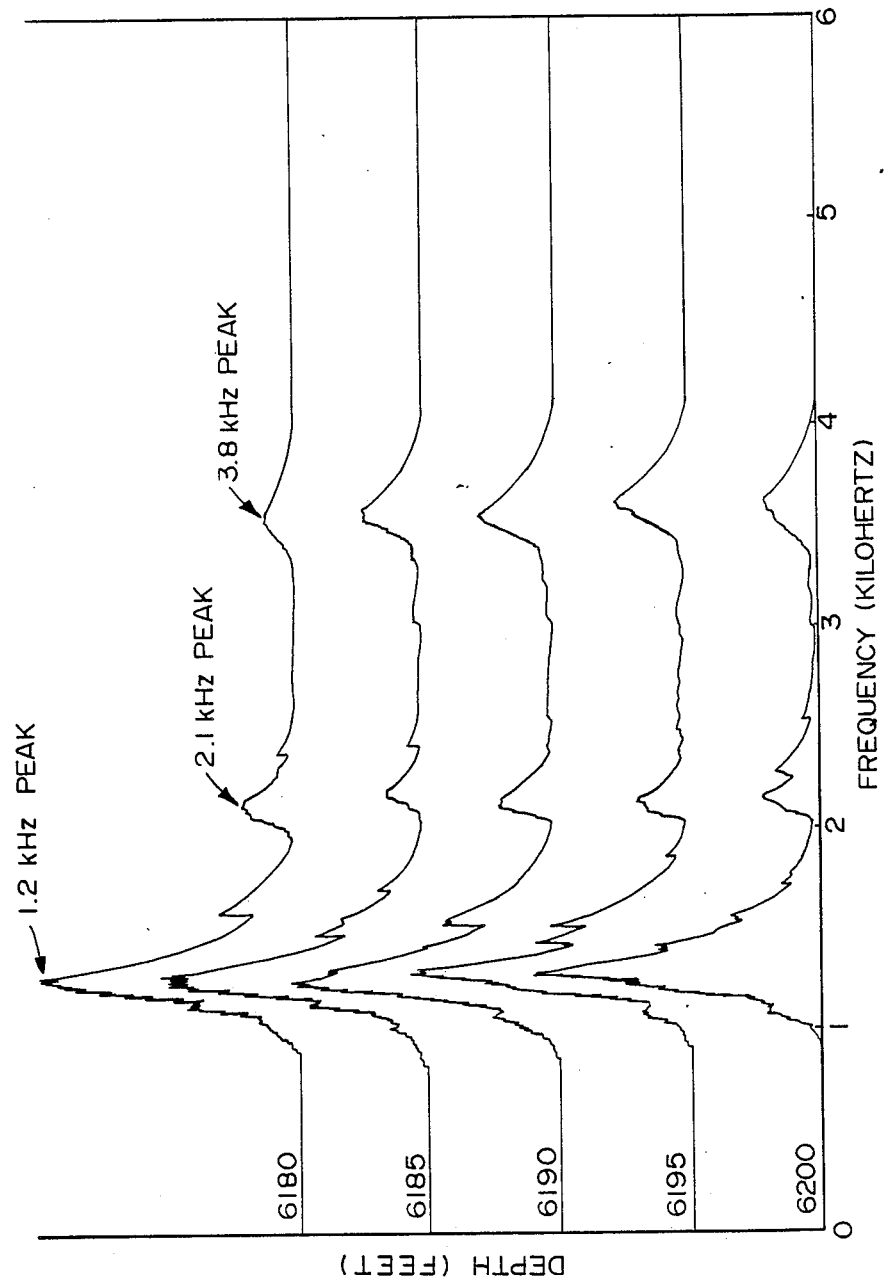

Referring now to FIG. 5, there is illustrated a series of such trances produced at different depths in a borehole from the output of amplitude detector 26 and signal digitizer 27 during a borehole logging operation. The logging tool was moved up the bordhole at a rate of 1000 ft./hr. Foot-by-foot recording of traces such as shown in FIG. 6 constitute what can be described as a frequency-scan acoustic log. The frequency sweep at one-foot intervals is triggered by the depth encoder 28 of FIG. 4. This encoder produces a triggering pulse at each one-foot interval of depth as the tool moves up the borehole. This pulse is also used to condition the signal digitizer 27 to start digitizing the output of amplitude detector 26. Digitization continues for the duration of the frequency scan. This cycle is repeated when the depth encoder produces the next triggering pulse for the next one-foot depth point. Since the transmitter-to-receiver spacing is small and the duration of the frequency scan is large, the delay due to travel of acoustic waves from the transmitter to the receiver can be neglected. Also the frequency sweep rate is linear. Therefore, frequency can be identified as being proportional to distance along the time axis of FIG. 5 with frequencies $f_1$ and $f_2$ marking the end points. To properly display the large range of amplitude variations in each trace by this method of recording requires an extended vertical scale. Very long records are needed to cover borehole intervals of practical interest.

Other more manageable recordings could be produced by such conventional methods as compressing the vertical scale or using shaded graphics to represent amplitude as examples. Another recording based on relative amplitude of individual resonance peaks as shown in FIG. 6 for frequency scan acoustic log trances generated with a flexible disc source. Three prominent peaks occur consistently at frequencies near 1.2, 2.1 and 3.8 kilohertz. These are characteristic transmitter resonances whose amplitudes are sensitive to the borehole material properties.

Recordings of peak amplitude ratios can also be used to display frequency scan acoustic data. For example, the amplitude ratio of the 1.2 and 2.1 kilohertz peaks of FIG. 6 could be used in this way. The 2.1 kilohertz peak has been found to be dominated by the transmitter characteristics and is not greatly affected by the borehole. However, the 1.2 kilohertz peak has been found to be dominate by the borehole and its material properties. Using the ratio of these peaks provides a normalized amplitude which is very sensitive to changes in borehole formation properties.

Figure 7:
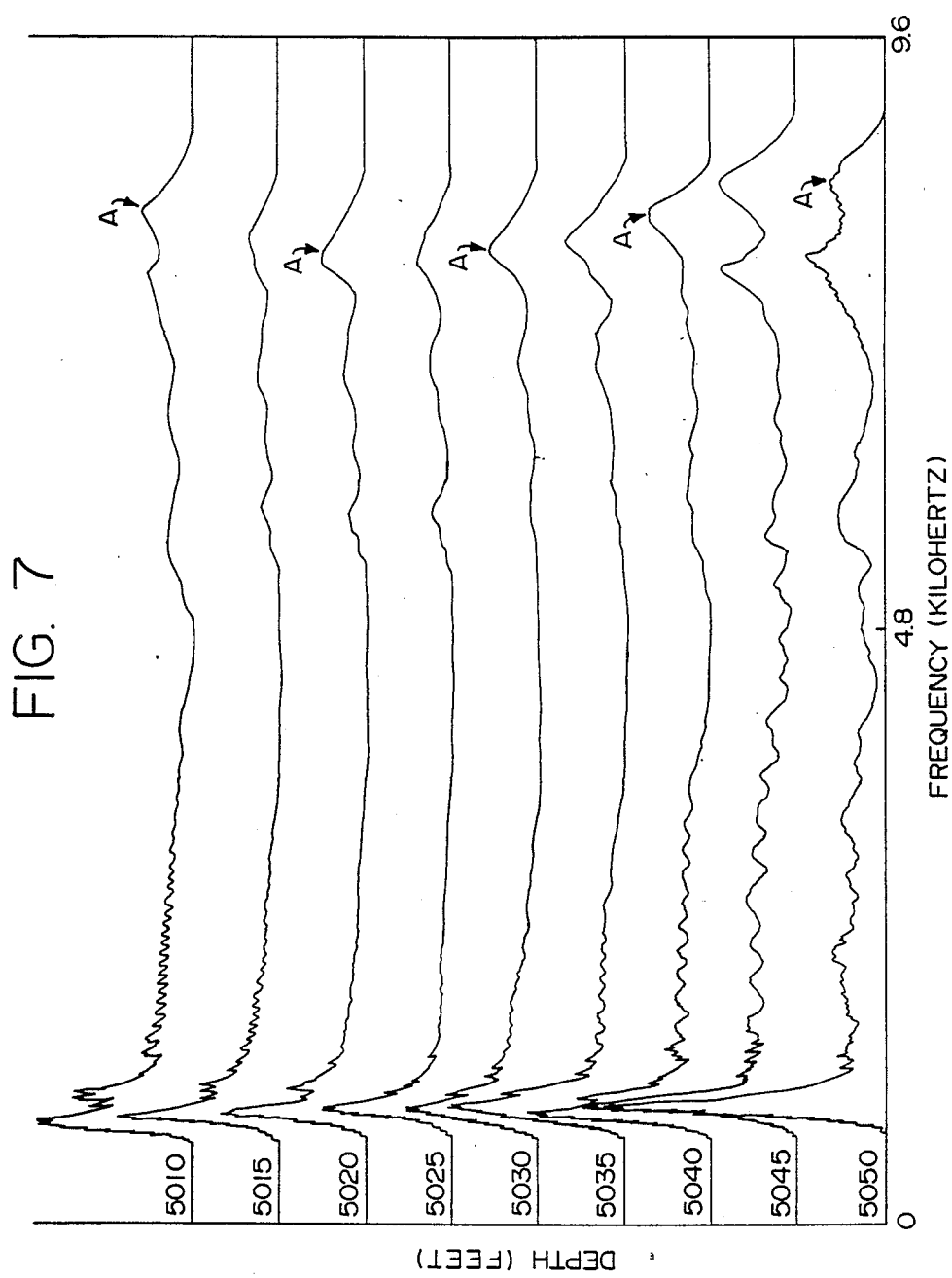

Changes in the frequency of a predominant peak can also be used as a recording. For example the peak A near 8 kilohertz in FIG. 7 shows significant frequency shifts with depth. A recording of such peak frequency with depth also provides a convenient display for borehole log analysis.

While a particular embodiment of the present invention has been described and illustrated, it will be understood that numerous modifications or alterations may be made without departing from the spirit and scope of the invention as set forth in the appended claims.

I claim:

1. An acoustic borehole logging method comprising the steps of:
    (a) traversing a borehole with a borehole logging tool containing a transmitter of acoustic energy having a free-field frequency spectrum with at least one characteristic resonant frequency of vibration and a spaced-apart receiver,
    (b) repeatedly exciting said transmitter with a swept frequency tone burst of a duration sufficiently greater than the travel time of acoustic energy between said transmitter and said receiver to allow borehole cavity resonances to be established within the borehole cavity formed between the borehole logging tool and the borehole wall,
    (c) detecting acoustic energy amplitude modulated by said borehole cavity resonances with said spaced-apart receiver, and
    (d) recording an amplitude versus frequency output of said receiver in correlation with depth as a log of the borehole frequency spectrum representative of the subsurface formation comprising the borehole wall.

2. The method of claim 1 further comprising the step of identifying the formations comprising the borehole wall from the borehole cavity resonances on the recorded amplitude versus frequency log of the borehole frequency spectrum.

3. The method of claim 2 wherein said step of identifying the material properties of the formations comprising the borehole wall comprises the steps of:
    (a) detecting an envelope of the amplitude modulation of said borehole cavity resonances on said borehole frequency spectrum, and
    (b) identifying the material properties of the formations comprising the borehole wall from the amplitude peaks of the borehole cavity resonances on said detected envelope of said borehole frequency spectrum.

4. The method of claim 2 further comprising the step of detecting frequency shifts with depth in the cavity resonance peaks of the recorded log of borehole frequency spectrum as an identification of changes in the material properties of the formations comprising the borehole wall.

5. The method of claim 2 further comprising the steps of:
    (a) identifying the amplitude peak on said recorded log of borehole frequency spectrum attributable to the transmitter free-field resonance frequency characteristic,
    (b) identifying the amplitude peak on said recorded log of borehole frequency spectrum attributable to the effect of the borehole on the free-field resonance characteristics of the transmitter,
    (c) determining the ratio of the amplitude peaks from steps (a) and (b), and
    (d) detecting changes in said ratio as an identification of changes in the material properties of the formations comprising the borehole wall.

6. An acoustic well logging method comprising the steps of:
    (a) traversing a borehole with a well logging tool containing an acoustic transmitter having a free-field acoustic energy frequency spectrum with at least one characteristic resonant frequency of vibration and an acoustic receiver spaced no greater than two feet from the transmitter,
    (b) repeatedly exciting said transmitter as the logging tool traverses the borehole with a swept frequency tone burst having a duration of at least one second to allow borehole cavity resonance to be established within the borehole cavity formed between the borehole logging tool and the borehole wall which cause the frequency sweep of said acoustic energy to be amplitude modulated by at least one borehole cavity resonance affected by the borehole wall, and
    (c) recording the output of said receiver as an amplitude versus frequency log of the borehole frequency spectrum of the borehole.

7. The method of claim 6 wherein said transmitter is excited with said swept frequency tone burst at periodic intervals within said boreholes.

8. The method of claim 7 wherein said intervals are at least one foot.

9. The method of claim 6 wherein said tone burst is a sine wave linearly swept in frequency over a range from about 0 to about 20 kilohertz.

* * * * *